(No Model.) 2 Sheets—Sheet 1.
G. O. LUCE & H. M. BARNGROVER.
MACHINE FOR PERFORATING AND GRADING FRUIT.
No. 533,716. Patented Feb. 5, 1895.
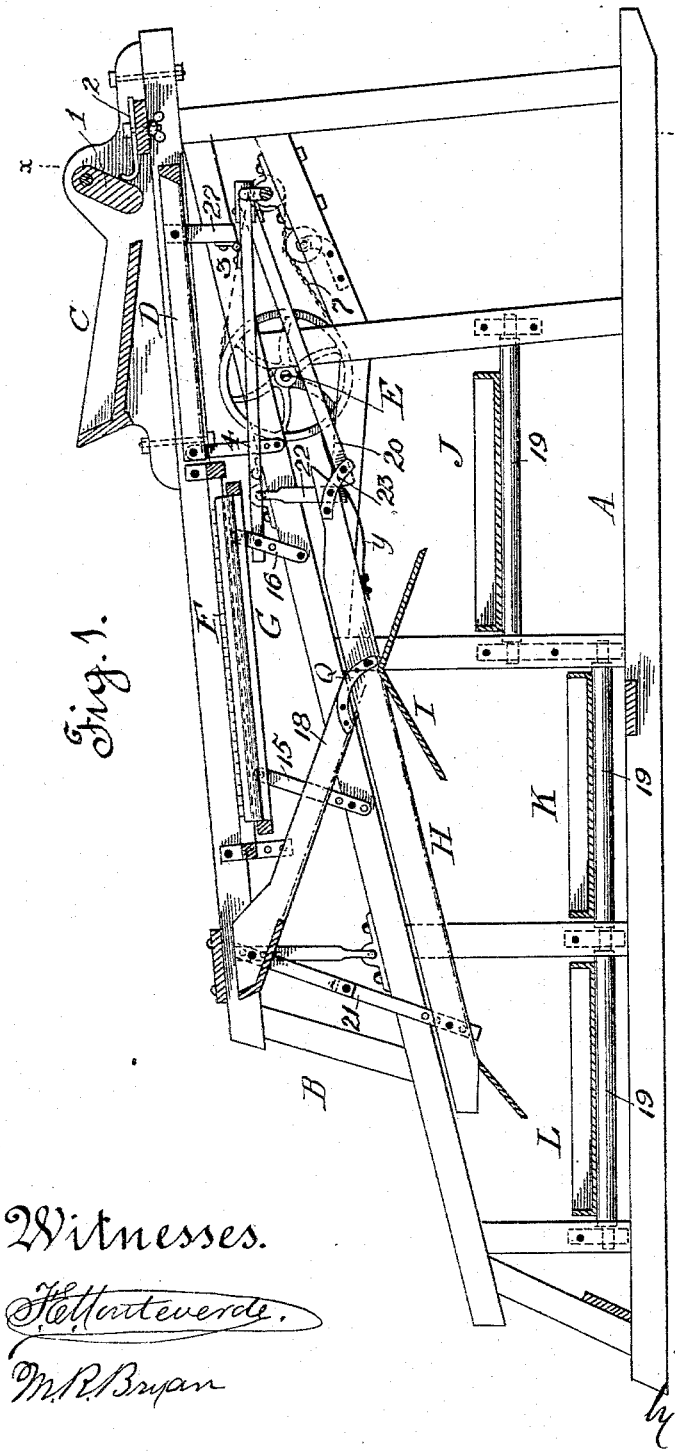
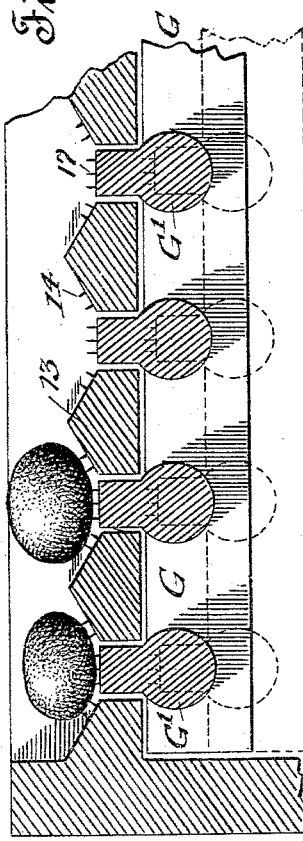
Witnesses.
F. Monteverde.
M. R. Bryan.
Inventors
George O. Luce
H. M. Barngrover
by Spear & Seely
Attorneys

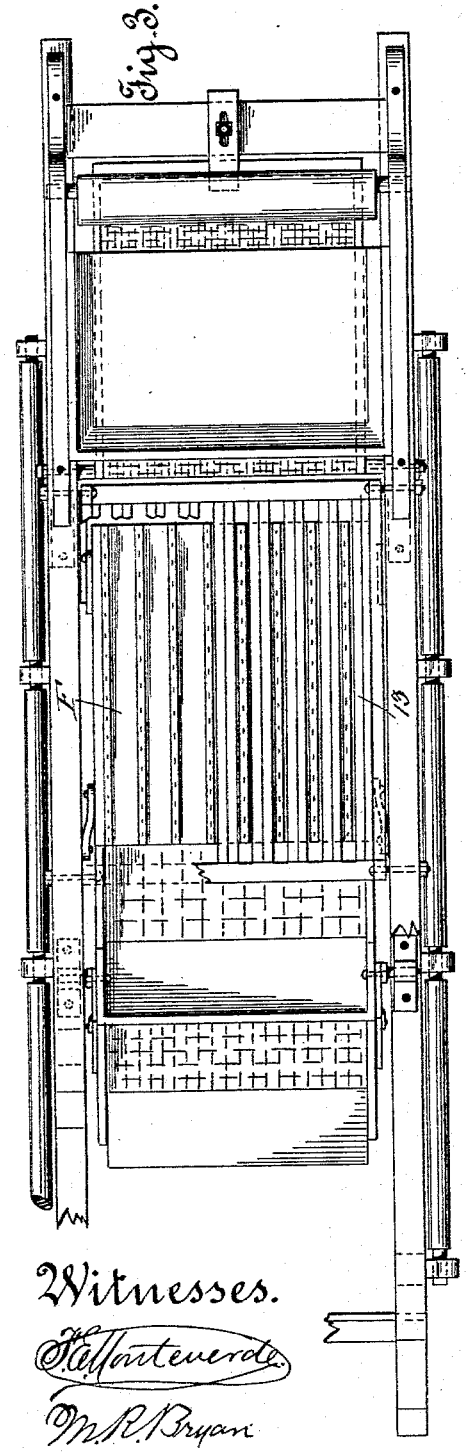

UNITED STATES PATENT OFFICE.

GEORGE ORANGE LUCE AND HARVEY M. BARNGROVER, OF LOS GATOS, CALIFORNIA.

MACHINE FOR PERFORATING AND GRADING FRUIT.

SPECIFICATION forming part of Letters Patent No. 533,716, dated February 5, 1895.

Application filed September 26, 1894. Serial No. 524,140. (No model.)

*To all whom it may concern:*

Be it known that we, GEORGE ORANGE LUCE and HARVEY M. BARNGROVER, citizens of the United States, residing at Los Gatos, in the county of Santa Clara and State of California, have invented certain new and useful Improvements in Machines for Perforating and Grading Fruit; and we do hereby declare that the following is a full, clear, and exact description thereof.

Our invention relates to a machine for pricking or perforating the skins of fresh fruit previously to a drying or evaporating process. This is for the purpose of allowing the hot air a readier access to the interior of each particular piece of fruit than is possible if the skins are left whole when the fruit is subjected to the hot air.

Our invention also includes special means for grading or assorting the fruit according to its size, and for delivering it, so graded, into trays, which, when filled, are ready to be placed in the drier.

Our machine will be clearly understood from the following detailed description, taken in connection with the accompanying drawings, in which—

Figure 1 is a side elevation of our machine, with some portions in section. Fig. 2 is a partial cross section of the stationary fruit bed and the movable prickers. Fig. 3 is a plan view. Fig. 4 is a section from the front on the line $x-x$ of Fig. 1. Fig. 5 is a broken plan, partly broken away, and showing the means for driving the moving parts.

A represents the frame of the machine and B is an upper supplementary frame secured to it. C is a receiving hopper near one end of the upper frame, in which the fresh fruit is placed and from which it is delivered to the machine. In the throat of the hopper is a pivoted bar 1, which is adjusted by means of a slotted plate 2 and a thumb-screw. These devices allow the fruit to be delivered from the hopper, and at the same time regulate the supply. The fruit delivered in this manner falls upon a cleaning tray D, having a perforated or wire bottom. This tray slides on the frame and is operated by arms 27, one on each side, which are pivoted or hinged as shown at 3 to the connecting rod 4.

E is a shaft or pin journaled in the frame (Fig. 5), and which may extend transversely entirely across the machine, so that it may be arranged to be operated from both sides if desired. Upon this shaft is secured the sprocket wheel 5 having the crank 6. A sprocket chain 7 passes from the wheel to a smaller sprocket 8, an adjustable idler being provided to keep the proper tension upon the chain. The sprocket 8 is secured outside of the frame, upon a transverse shaft 10 having two cranks 11 and 12, one near each end inside the frame. These cranks are in the same plane relatively to the shaft, and their operation and that of their connections is the same at both sides of the machine. The connecting rods 4 are pivoted to these cranks, and derive from them a compound oscillation, that is, vertically and longitudinally. The supports or arms 27 being hinged to the connecting rod, it follows that the tray D will derive the same motion as that of the rod, and will shake and toss the fruit so as to clean it from leaves, stems, or dirt of any kind.

The oscillation of the tray D, which is slightly inclined, (Fig. 1,) carries the fruit back through the machine and deposits it upon the stationary bed or table F. This bed is a rectangular frame, the bottom of which is composed of longitudinal beveled slats 13, spaced apart throughout the width of the frame, and provided with pricking points 14. Below the bed F, is the oscillating pricking frame G. This frame is connected by adjustable inclined links 15, 16, to the main frame, and the link 16, is pivoted to the connecting rod 4. The motion of the rod, therefore imparts a compound rocking motion to the frame G, partly vertical and partly horizontal. Secured to the frame G, are longitudinal pricking bars G', (Fig. 2,) having flat upper faces provided with pricking points 17. These bars, as the frame G, oscillates, rise and fall through the spaces between the slats of the stationary bed, and, in conjunction with the prickers 14, thoroughly perforate the skin of the fruit and at the same time move it along the bed.

The pricked fruit is discharged from the end of the bed upon the incline 18, of the grading frame. This frame is composed of two passages 18, and H, formed upon opposing inclines and having perforated or open work bottoms. The two frames are adjustable to different relative angles by means of the hinge Q, and sectional arm 21. At their junction is an angular deflector I. The grading frame is in this case shown as intended to assort the fruit into three sizes. The largest fruit passes at once over one face of the deflector I, and falls directly into the receiving tray J. This is because the largest size of fruit cannot pass through the bottom of the incline 18. The intermediate and smallest kinds of fruit drop through this bottom and commence to pass down the incline H. The open work of the bottom of this last named incline is of proper size to permit the smallest fruit to drop through upon the deflector I and thence into the tray K. The intermediate size which cannot escape through the bottom of the incline H, travels down its whole extent and is discharged at its end into the tray L. We thus have three grades or sizes of fruit cleaned, pricked and assorted ready for the drier.

The trays J, K, and L, are mounted upon rollers 19, journaled in the frame so that they can be conveniently pushed into place and removed bodily for insertion into the drier.

The grading frame receives an oscillating motion from the cranks 11, and 12, through connecting rods 20, one at each side attached to such cranks. The end of the frame is hung by a bail 22, from the main frame. In order to loosen the fruit while on the grading frame and prevent it from sticking at any point the frame is given a jar by means of the spring $y$, (Fig. 1) connected to the frame and bearing upon the rod 20.

Having described our invention, what we claim is—

1. In a machine for pricking or perforating fruit, a stationary slotted bed, in combination with an oscillating frame having pricking bars working in said slots and means for oscillating said frame, substantially as set forth.

2. The stationary fruit bed, having longitudinal beveled slats provided with pricking points, in combination with the rocking pricker frame, having alternating slats provided with pricking points, and mechanism for rocking said pricker frame, substantially as set forth.

3. In a machine for pricking fruit, an inclined stationary bed having beveled longitudinal slats provided with pricking points, an oscillating frame beneath having pricking bars adapted to work between said slats, means for feeding the fruit to said bed, and means for oscillating the pricking frame, substantially as set forth.

4. In a machine for pricking fruit and in combination, a feeding hopper, a swinging cleaning tray beneath the same, a slotted bed into which said tray delivers the fruit, an oscillating frame having pricking points, and means for moving said tray, substantially as set forth.

5. In a machine for pricking fruit, and in combination, a stationary slotted fruit bed, an oscillating pricking frame, a driving wheel, a driven shaft connected thereto, cranks on said shaft, and connecting rods from said cranks to the pricking frame, substantially as set forth.

6. In a machine for pricking fruit, and in combination, a stationary slotted fruit bed, an oscillating pricker frame, a driving wheel, a driven shaft connected thereto, cranks on said shaft, connecting rods from said cranks to the pricking frame, and a swinging cleaning tray hinged to said connecting rods and operated by their movement, substantially as set forth.

7. In a machine for pricking fruit, and in combination, a main frame, a stationary slotted fruit bed, an oscillating pricker-frame connected by front and rear swinging links to the main frame, a driving wheel, a driven shaft connected thereto, cranks upon said shaft and connecting rods from said cranks to the front links of the pricker frame, substantially as set forth.

8. In a machine for pricking and grading fruit, the combination with the stationary pricking bed, and oscillating pricking frame, of a movable grading frame, a driven crank shaft a connecting rod from each crank for operating the pricking frame, and a connecting rod from the same crank for operating the grading frame, substantially as set forth.

9. In combination with a main frame, fruit pricking mechanism, and means for operating it, a swinging grading frame composed of two inclined members meeting at an acute angle, a deflector at the angle, and two or more trays for receiving the fruit from the respective inclines, substantially as set forth.

10. In a machine for pricking and grading fruit, the combination with the main frame supporting the pricking mechanism and the grading and discharging mechanism, of longitudinal rollers journaled in the main frame and adapted to support trays for receiving the pricked and graded fruit from the grading frame, substantially as set forth.

11. In a machine for pricking and grading fruit, a driving wheel, a single driven shaft having a crank near each end, an oscillating pricker frame working in a stationary slotted fruit bed, a suspended grading frame below the fruit bed, and a connecting rod from each crank to both the pricker-frame and the grading frame, substantially as set forth.

In testimony whereof we have affixed our signatures, in presence of two witnesses, this 3d day of September, 1894.

GEORGE ORANGE LUCE.
HARVEY M. BARNGROVER.

Witnesses:
SIDNEY J. TICE,
E. E. PLACE.